United States Patent
Da et al.

(10) Patent No.: US 6,922,546 B1
(45) Date of Patent: Jul. 26, 2005

(54) GPS SIGNAL ACQUISITION BASED ON FREQUENCY-DOMAIN AND TIME-DOMAIN PROCESSING

(75) Inventors: Ren Da, Bernards Township, NJ (US); Giovanni Vannucci, Township of Middletown, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/564,096

(22) Filed: May 3, 2000

(51) Int. Cl.[7] ............................................. H04B 7/185
(52) U.S. Cl. ................ 455/12.1; 455/13.2; 342/357.06; 342/457
(58) Field of Search .............................. 455/12.1, 13.3, 455/431, 427, 428, 429, 430, 13.1, 456.1, 456.2, 456.3, 457, 440; 342/357.06, 357.01, 457, 450; 340/988

(56) References Cited

U.S. PATENT DOCUMENTS

| | | | | |
|---|---|---|---|---|
| 4,445,118 A | * | 4/1984 | Taylor et al. | 342/357.09 |
| 4,998,111 A | * | 3/1991 | Ma et al. | 342/352 |
| 5,175,557 A | * | 12/1992 | King et al. | 342/357.12 |
| 5,365,450 A | | 11/1994 | Schuchman et al. | |
| 5,418,538 A | | 5/1995 | Lau | |
| 5,559,520 A | * | 9/1996 | Barzegar et al. | 342/357.1 |
| 5,615,236 A | * | 3/1997 | Turney | 375/365 |
| RE35,498 E | * | 4/1997 | Barnard | 342/185 |
| 5,663,735 A | * | 9/1997 | Eshenbach | 342/357.15 |
| 5,798,732 A | * | 8/1998 | Eshenbash | 342/357 |
| 5,857,155 A | * | 1/1999 | Hill et al. | 455/456.3 |
| 6,028,887 A | * | 2/2000 | Harrison et al. | 375/147 |
| 6,075,987 A | * | 6/2000 | Camp et al. | 455/427 |
| 6,101,178 A | * | 8/2000 | Beal | 370/336 |
| 6,114,991 A | * | 9/2000 | Richton et al. | 342/357.1 |
| 6,121,923 A | | 9/2000 | King | |
| 6,256,475 B1 | * | 7/2001 | Vannucci | 455/12.1 |
| 6,320,536 B1 | * | 11/2001 | Sasaki | 342/357.15 |
| 6,430,415 B1 | * | 8/2002 | Agashe et al. | 455/456.5 |
| 6,538,600 B1 | * | 3/2003 | Richton et al. | 342/357.1 |
| 6,560,536 B1 | * | 5/2003 | Sullivan et al. | 701/214 |

FOREIGN PATENT DOCUMENTS

| | | |
|---|---|---|
| CA | 2306380 | 4/1999 |
| WO | WO 00/14568 | 3/2000 |
| WO | WO 00/21223 | 4/2000 |
| WO | WO 01/84080 A1 | 11/2001 |

* cited by examiner

Primary Examiner—Tilahun Gesesse

(57) ABSTRACT

An improved code acquisition scheme for faster acquisition of GPS "coarse acquisition" (C/A) codes leads to faster detection of GPS signals, and thereby a wireless terminal may determine its position in a shorter period of time. The scheme is a combination of a frequency-domain and time-domain code acquisition techniques. The scheme utilizes a frequency-domain code acquisition technique to detect one GPS signal and to create a precise timing reference at the wireless terminal, and then utilizes time-domain code acquisition techniques to detect other GPS signals from the same satellite or other satellites faster. The scheme has the advantage of being able to be used for any wireless communications system without the requirement of maintaining a precise timing reference in the wireless terminals, and without the requirement of heavy computational resources that are usually needed in systems that utilize frequency-domain code acquisition techniques.

28 Claims, 8 Drawing Sheets

GPS SIGNAL ACQUISITION BASED ON FREQUENCY-DOMAIN AND TIME-DOMAIN PROCESSING

CROSS-REFERENCE TO RELATED APPLICATIONS

The subject matter of this application is related to U.S. patent application Ser. No. 08/927,432 filed Sep. 11, 1997 and to U.S. patent application Ser. No. 08/927,434 filed Sep. 11, 1997, the teachings of both of which are incorporated herein by reference.

BACKGROUND OF THE INVENTION

1. Field of the Invention

The present invention relates to satellite navigation systems, and, more particularly, to satellite navigation systems employing wireless communications technology to enhance signal-detection sensitivity.

2. Description of the Related Art

A satellite navigation system, such as the Global Positioning System (GPS), comprises a constellation of satellites that transmit GPS signals that can be used by a wireless terminal to determine the wireless terminal's position. The orbits of the satellites are arranged in multiple planes in order that signals can be received from at least four satellites at any position on earth. More typically, signals are received from six or eight satellites at most places on the earth's surface.

FIG. 1 illustrates GPS system 100 of the prior art. In prior art system 100, one or more satellites 101 of a satellite constellation transmit GPS signals 102 that are received by a wireless terminal 103. As is known in the art, the positioning operation is performed by receiving GPS signals 102 from three or more satellites. The basic method of determining position is based on knowing the time difference for each of the satellites. The time difference for a satellite is the time required for a GPS signal 102 initiated at the satellite to be received by wireless terminal 103. When GPS signals 102 from three satellites are simultaneously received, a "two-dimensional" position (latitude and longitude) can be determined. When GPS signals 102 are received from four or more satellites simultaneously, a "three-dimensional" position (latitude, longitude, and altitude) can be determined. Wireless terminal 103 typically comprises a GPS receiver 105 for receiving GPS signals 102 via a GPS antenna 107. A measured range, referred to as a "pseudorange," is determined between GPS receiver 105 and each of the satellites based upon the corresponding signal propagation time. The measured range is referred to as the pseudorange, because there is typically a time-offset between the mutually synchronized clocks on the satellites and the local clock within GPS receiver 105. To determine a three-dimensional position, at least four GPS signals are needed to solve for the four unknowns representing the time offset and the three-dimensional position of wireless terminal 103.

The nature of the GPS signals transmitted from the satellites is well known in the art. Each satellite transmits two spread-spectrum, L-band carrier signals, referred to as the L1 and L2 signals. Two signals are needed if it is desired to eliminate errors that may arise due to refraction of the transmitted signals by the ionosphere. The L1 signal from each satellite is binary-phase shift-key (BPSK)-modulated by two pseudorandom noise (PN) codes in phase quadrature. A pseudorandom noise code sequence is a series of numbers that is random in the sense that knowledge of which numbers have already been received does not provide assistance in predicting the next received number. Further, using a binary PN code to modulate the phase of a carrier signal produces a suppressed carrier spread-spectrum signal. The L2 signal from each satellite is BPSK-modulated by only one of the PN codes. Use of the PN codes allows simultaneous use of a plurality of GPS signals for determining a receiver's position and for providing satellite-specific navigation information. A GPS signal transmitted by a particular satellite is selected by generating and matching, or correlating, the PN code for that particular satellite. Some of the PN codes are known and are generated or stored in GPS receiver 105. Other PN codes are not publicly known.

A first known PN code for each satellite is the "coarse acquisition" or C/A code. A second known PN code for each satellite is the "precision" or P code. The C/A code is intended to facilitate rapid GPS signal acquisition and hand over to the P code. The C/A code is a relatively short, coarse-grained code. The C/A code has a relatively short length before it repeats. The P code, on the other hand, is a relatively long, fine-grained code. The full P code has a length of 259 days, with each satellite transmitting a unique portion of the full P code. The portion of the P code transmitted by a given satellite has a length of precisely one week before the portion repeats.

In GPS receiver 105, signals corresponding to the known C/A and P codes may be generated in the same manner as in the satellites. The L1 and L2 signals from a given satellite are demodulated by aligning the phases, i.e., adjusting the timing of the locally generated codes with those received from the satellites. To achieve phase alignment, the locally generated code replicas are correlated with the received GPS signals until the resultant output signal reaches a peak. Because the time at which each particular bit of the PN code sequence is transmitted from the satellite is defined, the time of receipt of a particular bit can be used as a measure of the range to the satellite. Because the CIA and P codes are unique for each satellite, a specific GPS satellite may be identified based on the results of the correlations between the received GPS signals and the locally generated C/A and P code replicas. Methods for generating the C/A and P codes are set forth in various publicly available publications.

The C/A code component of the L1 signal is provided for commercial use. Various techniques have been developed to replicate the C/A code in GPS receivers. As a consequence of the repetition of the C/A code approximately once every millisecond, correlation at the GPS receiver may be performed in the absence of precise knowledge of the time of transmission of each C/A code bit. Acquisition of the P code is generally acquired by first locking onto the C/A code. Once the C/A code has been acquired, the C/A code-modulated carrier component of the L1 signal carrier alone may allow for satisfactory measurements. However, when high-resolution measurements are desired to be made quickly, the L2 carrier signal must also be used. The unknown atmospheric delay of the L1 and L2 carriers may be determined when both the L1 and L2 carriers are used. The GPS signals are intended to be recovered by correlating each incoming signal with a locally generated replica of each code, both the P code and the C/A code. The result of such correlation is that the carrier in the GPS signals is totally recovered when the modulating signal is the PN code sequence that matches the P code or the C/A code. The locally generated PN code is adjusted in time to provide an optimum correlation with the incoming signal. The correlation output is then a single narrowband peak centered at the carrier frequency. The carrier recovered by correlation provides the best available signal-to-noise ratio.

The key to achieving GPS navigational performance is the processing of one or more GPS signals, each of which carries a coarse acquisition code, to achieve code acquisition of these GPS signals.

There are two commonly known approaches for the C/A code acquisition process: code acquisition in the frequency domain and code acquisition in the time domain. Frequency-domain code acquisition schemes are based on the fast Fourier transformation. Time-domain code acquisition schemes are processes that align the incoming GPS code with the local replicated code within one chip or, equivalently about one micro-second, since the chip rate for a GPS C/A code is 1.023 MHz.

For a conventional wireless terminal to achieve code acquisition in the time domain, the correlation procedure is typically implemented many times, where each implementation searches one possible code phase at one possible Doppler frequency. There are a total of 1023 chips in a C/A PN code, and the Doppler frequency range of the GPS signal is (−5000, +5000) Hz. As a result, the maximum number of code-phase searching steps is 2046, while the maximum number of Doppler searching steps is 200. For each searching step, one may increase code phase by a half-chip, or one may increase the Doppler frequency by 500 Hz. As a result, the acquisition time is proportional to the product of the number of code-phase searching steps and the number of carrier-frequency searching steps.

If the satellite Doppler frequencies are known or can be predicted, they can be utilized to reduce the signal detection acquisition time for both the time-domain and the frequency-domain approaches. If the satellite code phases or ranges are known or can be predicted, they may be useful for the time-domain code acquisition schemes provided that the wireless terminal has built a precise timing reference. The frequency-domain code acquisition scheme however does not rely on the satellite code phase information and thus places a heavier computational burden on the wireless terminal than the time-domain code acquisition approach. Furthermore, the wireless terminal utilizing a frequency-domain code acquisition scheme takes a longer time to fund its position.

SUMMARY OF THE INVENTION

An improved code acquisition scheme for faster acquisition of GPS "coarse acquisition" (C/A) codes is proposed. The faster acquisition of C/A codes leads to faster detection of GPS signals, and thereby a wireless terminal may determine its position in a shorter period of time. The proposed scheme is a combination of a time-domain code acquisition scheme and a frequency-domain code acquisition scheme. The proposed scheme utilizes a frequency-domain code acquisition technique to detect one GPS signal and to create a precise timing reference, and then utilizes time-domain code acquisition techniques to detect other GPS signals from the same satellite or other satellites faster. The proposed scheme has the advantage of being able to be used for any wireless communications system without the requirement of maintaining a precise timing reference in the wireless terminals, and without the requirement of heavy computational resources that are usually needed in systems that utilize frequency-domain code acquisition schemes.

In accordance with one implementation of the present invention, a wireless GPS information server (WGIS) communicating with the wireless terminal via a wireless or land-line link is provided. The WGIS maintains information about all satellites in view. This information includes each satellite's navigation data which is modulated onto the corresponding GPS signal. The WGIS then utilizes known features of the navigation data stream and the demodulated navigation data to predict one or more code phases (or equivalently the predicted ranges) and one or more Doppler frequencies. The server then forwards the predicted code phases and the predicted Doppler frequencies to the wireless terminal.

The wireless terminal detects at least one GPS signal by a conventional code acquisition technique in the frequency domain. The predicted Doppler frequency received from the WGIS helps the detection process by narrowing the frequency search bin. After the detection of a GPS signal from a satellite, the code phase of the GPS signal or the pseudo-range from the wireless-terminal to the satellite is measured. The difference between the previously predicted code phase received from the WGIS and the actual measured code phase is then calculated. The difference between the code phases is then converted into time units based on the known GPS signal frequency. For example, 1023 chips of code phase equals 1 ms of time. A precise timing reference is then established by adjusting the time reference of the wireless terminal by the calculated time units.

The wireless terminal may then use the precise timing reference to apply time-domain code acquisition techniques to detect other GPS signals from the same satellite or other satellites in a relatively short time. These other GPS signals may be previously stored GPS signals or subsequent GPS signals. Generally, the WGIS provides the wireless terminal with satellite Doppler frequencies having an error less than 50 Hz. As such, the wireless terminal need no longer to try all possible frequency steps in the code acquisition process. The acquisition time is reduced by being proportional to the actual number of code-phase searching steps. Furthermore, the WGIS provides the wireless terminal with the satellite's code phase information, and, thus the wireless terminal only needs to search within the possible code phases defined by the timing accuracy. Therefore, the wireless terminal has the advantages of faster code acquisition and lower computational requirements. For example, if the wireless terminal has established a precise local timing reference accurate to the level of a few microseconds, the wireless terminal needs to search GPS signals in only a few code phase chips and thereby wireless terminal may acquire subsequent GPS signals in a relatively short period of time.

In an alternative implementation, the code phase and Doppler frequency prediction capabilities are provided within the wireless terminal. In this embodiment, the WGIS receives a GPS signal, demodulates the navigation data modulated on the GPS signal, and forwards the demodulated navigation data to the wireless terminal. The wireless terminal receives the demodulated navigation data from the WGIS and predicts a code phase and a Doppler frequency. The remaining steps of detection of a GPS signal in the frequency domain, measurement of an actual code phase, comparison of the predicted code phase and the actual code phase, computation of a difference between both code phases, conversion of the difference between code phases to time units, establishment of a precise timing reference, and detection of other GPS signals in the time domain remain the same as in the first embodiment.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION OF A PREFERRED EMBODIMENT

Figure 1:
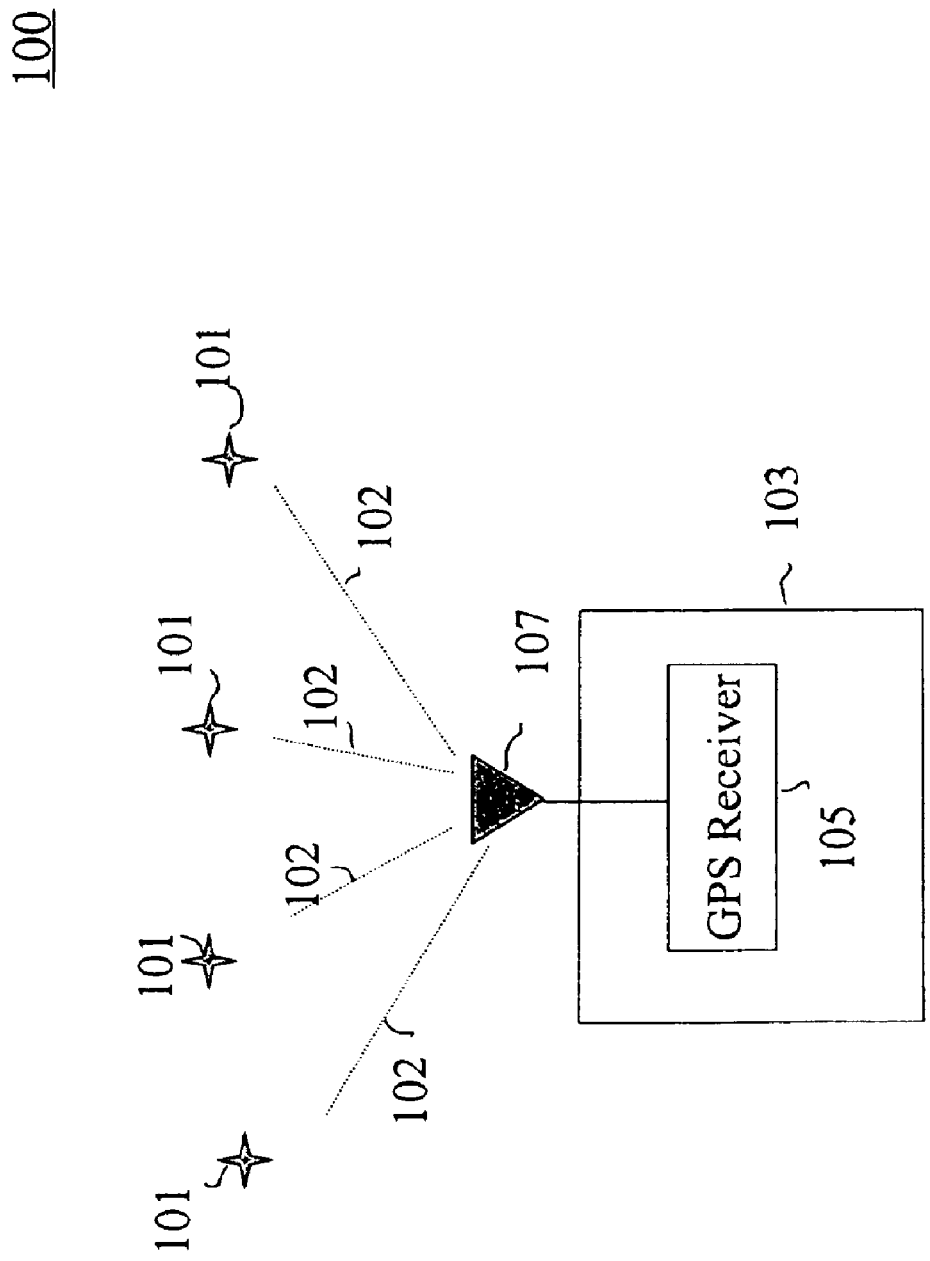
FIG. 1 illustrates a prior art satellite navigation system.
Figure 2:
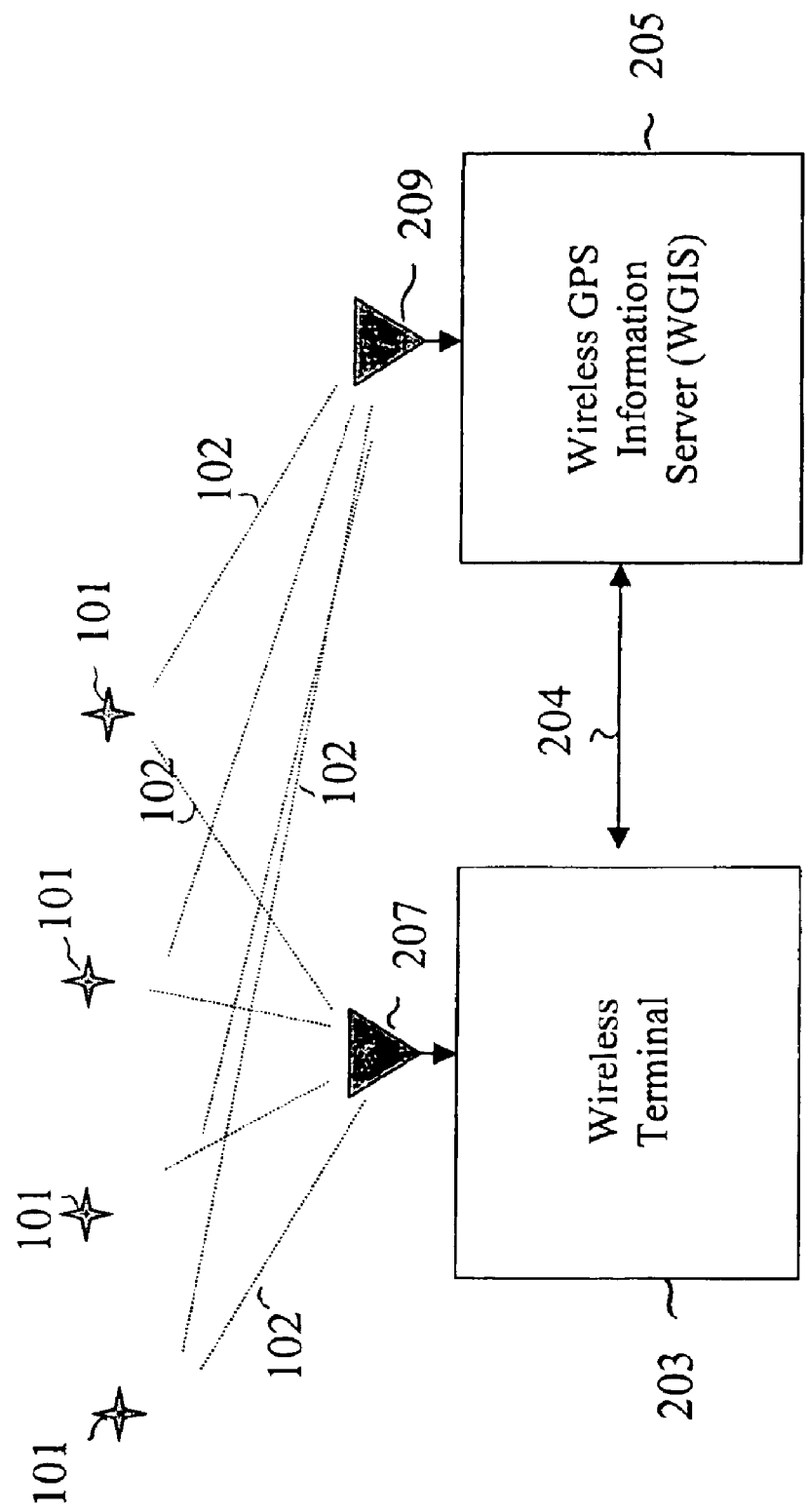
FIG. 2 illustrates a wireless satellite navigation system in accordance with an illustrative embodiment of the present invention.

FIG. 2 illustrates a wireless satellite navigation system 200 in accordance with an illustrative embodiment of the present invention. Wireless satellite navigation system 200 comprises a conventional satellite constellation (i.e., a plurality of GPS satellites 101), a wireless terminal 203, and a wireless GPS information server (WGIS) server 205. Satellite constellation 101 is preferably the GPS system, which is well known in the art. Those skilled in the art will understand how to implement the present invention in the context of satellite navigation systems other than the GPS system.

WGIS 205 communicates with wireless terminal 203 via a telecommunications link 204, which may be a wireless link or a land-line link. One goal of the illustrative embodiment is to create a precise timing reference so that time-domain code-acquisition processing may be applied in systems where wireless terminals do not otherwise maintain precise timing references.

In accordance with the illustrative embodiment, the signal acquisition and signal processing requirements of wireless terminal 203 are reduced by the use of WGIS 205. In particular, the tasks of GPS code acquisition and GPS signal processing required for a conventional wireless terminal are divided between wireless terminal 203 and WGIS 205. Partially processed signal information can be exchanged back and forth between the two through telecommunications link 204 as needed to achieve a desirable division of processing tasks between wireless terminal 203 and WGIS 205.

It is possible to divide the processing tasks between wireless terminal 203 and WGIS 205, because the GPS signal transmitted by each satellite 101 carries the satellite's position data as well as information about clock timing. More specifically, the GPS signal is modulated with digital information in a manner similar to how, for example, a cellular telephone's radio signal is modulated with voice data. Such information can be detected and demodulated by any receiver adapted to do so. The position data reconstructed by the receiver is an exact replica of the information modulated onto the signal by the transmitter (except for possible errors due to noise, distortion, etc.) and is the same for all receivers, regardless of their position. This position data shall be referred to as "information about the satellite's ephemeris."

In a GPS system, there is also important information in the timing of the GPS signal. The transmitting satellite carefully adjusts the timing of the transmitted GPS signal according to some precise reference, such that the timing of the signal, as received by a wireless terminal, carries information about the distance between the transmitting satellite and the wireless terminal. Such information will be different from one wireless terminal to another wireless terminal, and is only available at the wireless terminal itself. This information shall be referred to as "ranging information."

For example, since each satellite 101 transmits a GPS signal 102 that contains both kinds of information to both wireless terminals 203 and WGIS 205, some or all of the information about the satellite's ephemeris can be acquired by WGIS 205 even though the ranging information acquired by WGIS 205 is relevant to the position of WGIS 205 and not to the position of wireless terminal 203.

However, WGIS 205 may have approximate knowledge of the position of wireless terminal 203 (for example, through knowledge of the cell and sector where a wireless terminal is located). Therefore, WGIS 205 may combine this knowledge with the acquired ranging information and with the satellite's ephemeris information to predict ranging information for wireless terminal 203 (in particular, predict a code phase and a Doppler frequency for wireless terminal 203). These predictions, together with the satellite's ephemeris information, are transmitted, via telecommunications link 204, to wireless terminal 203 to assist wireless terminal 203 in reducing signal acquisition time for other GPS signals.

Because wireless terminal 203 is freed from the task of acquiring some or all of the information about the satellite's ephemeris and is advantageously provided with a prediction of the ranging information, wireless terminal 203 can use the predicted information to create a precise timing reference and then acquire other GPS signals in a relatively short period of time by utilizing time-domain code acquisition techniques.

Figure 3:
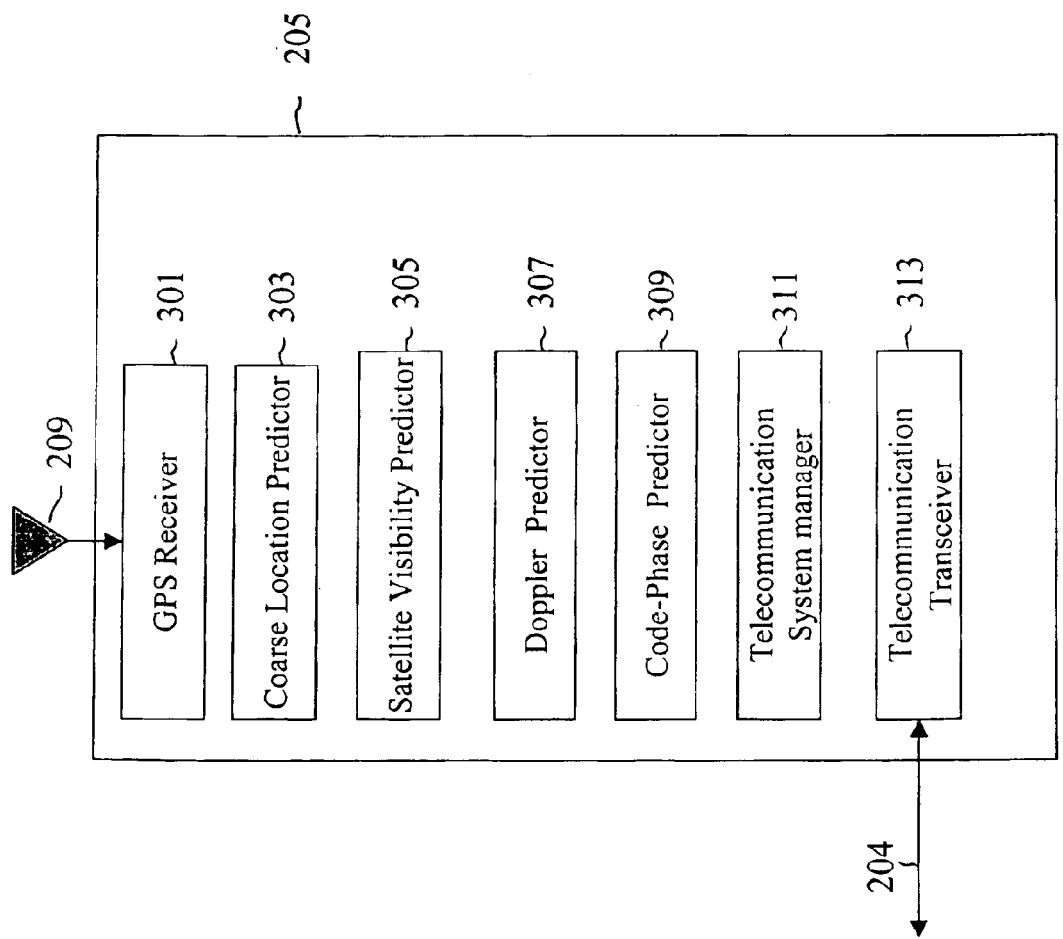
FIG. 3 is a block diagram illustrating major components of a wireless GPS information server (WGIS) in accordance with a first implementation of the present invention.

FIG. 3 is a block diagram illustrating major components of WGIS 205 in accordance with a first implementation of the present invention. In this embodiment, WGIS 205 comprises a GPS antenna 209, a GPS receiver 301, a coarse location predictor 303, a satellite visibility predicator 305, a Doppler predictor 307, a code-phase predictor 309, a telecommunication system manager 311, and a telecommunication transceiver 313.

In general, WGIS 205 uses its GPS receiver 301 (or alternatively a network of GPS receivers (not shown)) to obtain from each satellite above the horizon both ranging information and information about the satellite's ephemeris, in well-known fashion using the Coarse Acquisition (C/A) code and possibly the Precision (P) code. In the process of obtaining the ranging and satellite ephemeris information, WGIS 205 determines from its GPS receiver 301, among other things: (1) the 50-bps modulated bit stream from each satellite, (2) the identity of satellites that are above the horizon (relative to the terminal), (3) the PN synchronization from each satellite (i.e., the exact timing of the PN code transmitted by each satellite), and (4) the Doppler shift associated with each satellite.

When WGIS 205 is part of a wireless telecommunications system that partitions a geographic area into a number of tessellated areas called "cells," WGIS 205 knows which cell wireless terminal 203 is in and, therefore, its location to within a few miles. Telecommunication system manager 311 informs coarse location predictor 303 of the cell in which wireless terminal 203 is located. Coarse location predictor 303 uses the information from telecommunications system manager 311 to predict the latitude and longitude of the location of wireless terminal 203.

For each GPS signal from a satellite 101 above the horizon, GPS receiver 301 determines the signal's exact time of arrival (i.e., its PN synchronization). GPS receiver 301 demodulates each acquired signal to recover its 50-bps modulated bit stream. Satellite visibility predictor 305 extracts satellite ephemeris information from the received modulated bit streams and estimates which satellites are visible to wireless terminal 203 at its location based on the predicted latitude and longitude generated by coarse location predictor 303. Doppler predictor 307 predicts a Doppler frequency for wireless terminal 203 based on the predicted latitude and latitude of the wireless terminal. In a similar manner, code-phase predictor 309 predicts a code phase for wireless terminal 203 based on the satellite ephemeris information extracted from the 50-bps modulated bit stream.

For at least one GPS signal processed by WGIS 205, telecommunications transceiver 313 transmits to wireless terminal 203 over a telecommunications channel 204: (1) the predicted code phase, (2) the predicted Doppler frequency, and (3) the demodulated 50-bps modulated bit stream. Collectively, this information is known as "Navigation Message Data."

Figure 4:
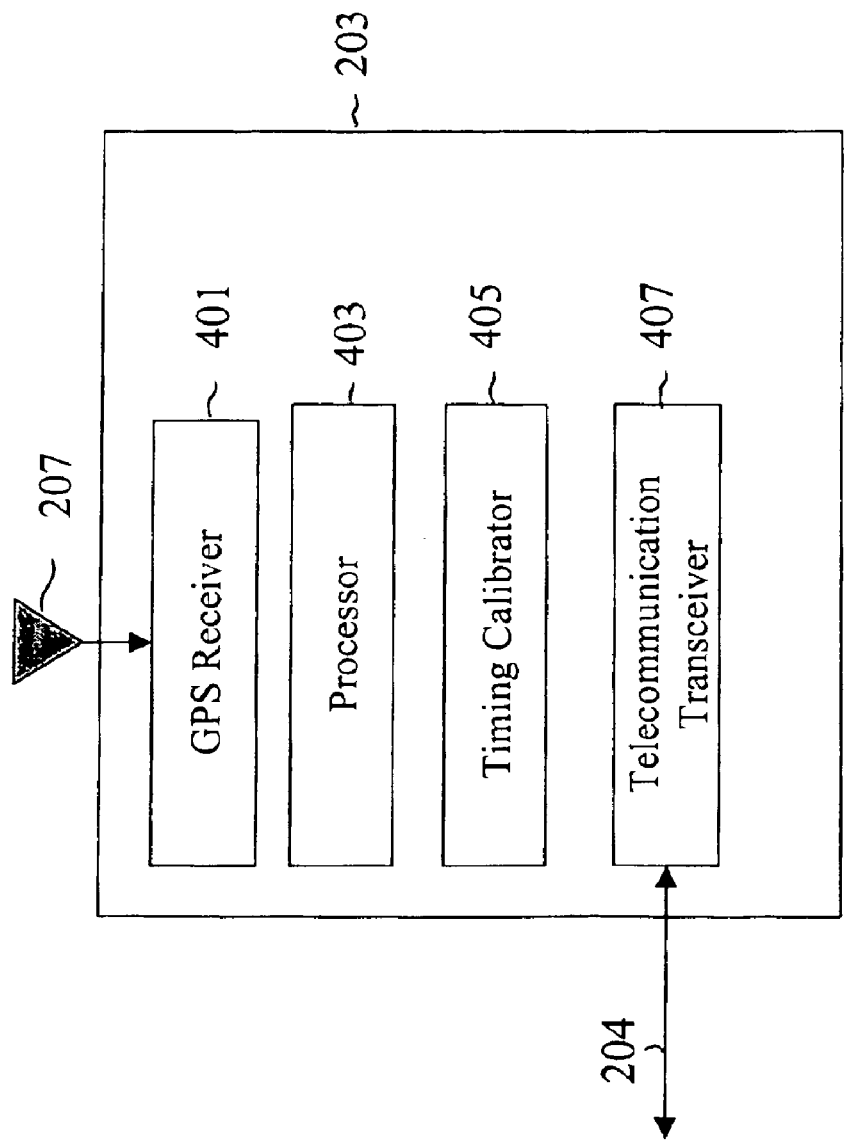
FIG. 4 is a block diagram illustrating major components of a wireless terminal in accordance with the first implementation of the present invention.

FIG. 4 is a block diagram illustrating major components of wireless terminal 203, which comprises: a GPS antenna 207, a GPS receiver 401, a processor 403, a timing calibrator 405, and a telecommunication transceiver 407. Preferably, but not necessarily, wireless terminal 203 is capable of performing all of the functionality associated with a typical wireless terminal (e.g., a cellular telephone). In addition, wireless terminal is preferably capable of having bi-directional communication capabilities with WGIS 205.

The Navigation Message Data transmitted from WGIS 205 is received by wireless terminal 203 via telecommunication transceiver 407, which passes the Navigation Message Data to processor 403. Wireless terminal 203 also receives the direct sequence spread spectrum C/A code signals from the visible satellites via GPS receiver 401. Wireless terminal 203 then detects one of the GPS signals utilizing a conventional frequency-domain code acquisition technique aided by the satellite Doppler frequency provided by WGIS 205.

Processor 403 computes the actual code phase associated with the detected GPS signal. Processor 403 then compares the actual code phase to the predicted code phase supplied by WGIS 205 to compute the difference between the actual code phase and the predicted code phase. Processor 405 then converts the difference between the code phases to time units and forwards that information to timing calibrator 405. Timing calibrator 405 adjusts the timing of a local clock maintained in the wireless terminal by the calculated time units to create a precise timing reference.

The wireless terminal is then capable of utilizing time-domain code acquisition techniques to detect other GPS signals, which may correspond to the same satellite or different satellites.

Figure 5:
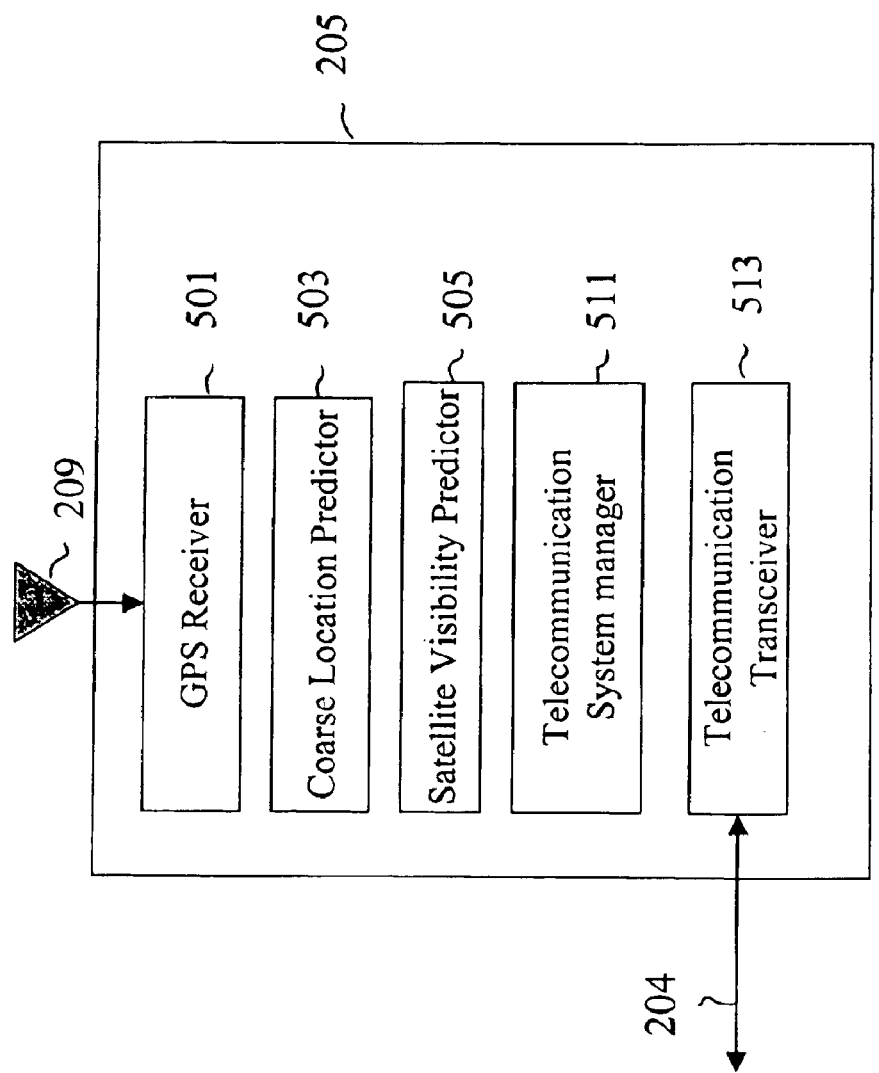
FIG. 5 is a block diagram illustrating major components of a WGIS in accordance with a second implementation of the present invention.

FIG. 5 illustrates major components of WGIS 205, in accordance with a second implementation of the present invention. In this implementation, WGIS 205 comprises a GPS antenna 209, a GPS receiver 501, a coarse location predictor 503, a satellite visibility predictor 505, a telecommunication system manager 511, and a telecommunication transceiver 513, each of which performs functions analogous to the corresponding components of WGIS 205 in the first implementation of FIG. 3. In this second implementation, however, telecommunication transceiver 513 forwards the demodulated 50-bps bit stream and predicted location of the wireless terminal to wireless terminal 203 via telecommunication link 204.

Figure 6:
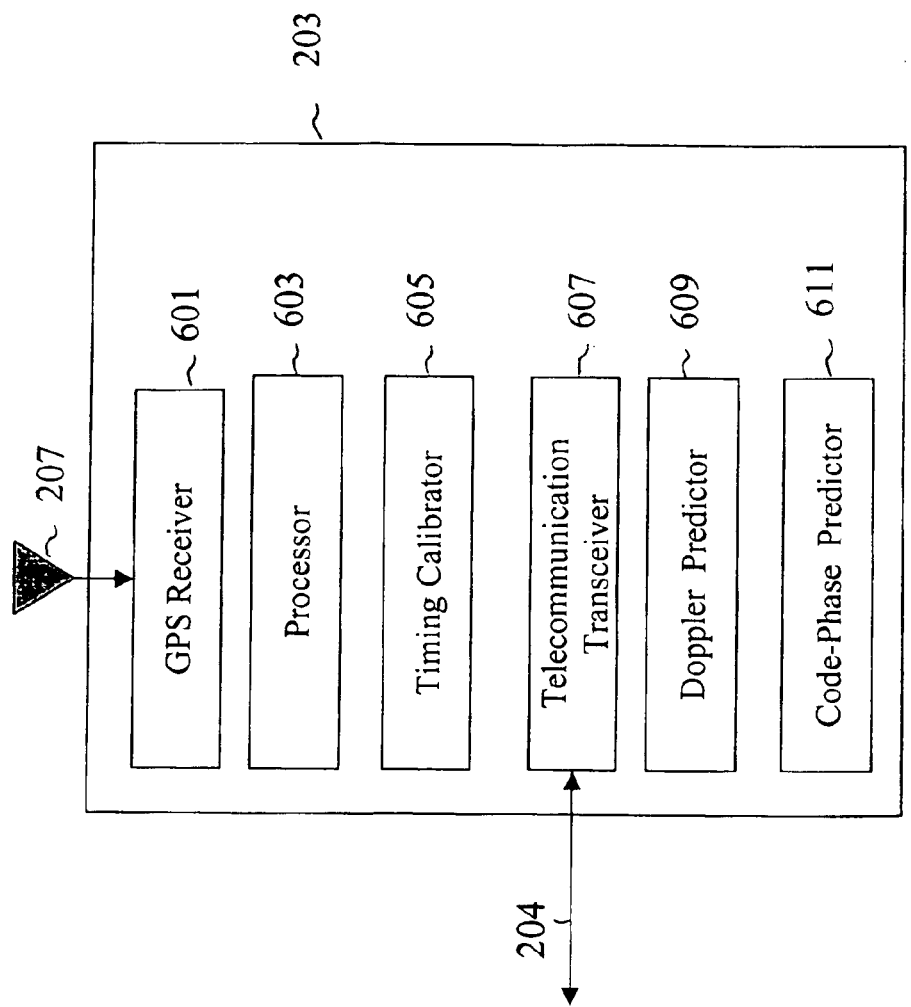
FIG. 6 is a block diagram illustrating major components of a wireless terminal in accordance with the second implementation of the present invention.

FIG. 6 illustrates major components of wireless terminal 203 in accordance with the second embodiment of the present invention. Wireless terminal 203 comprises a GPS antenna 207, a GPS receiver 601, a processor 603, a timing calibrator 605, a telecommunication transceiver 607, a Doppler predictor 609, and a code-phase predictor 611. Telecommunication transceiver 607 receives the demodulated 50-bps bit stream and approximate wireless terminal location from WGIS 205, and predictors 609 and 611 utilize this information to predict a code phase and a Doppler frequency, respectively.

GPS receiver 601 detects a GPS signal utilizing a frequency-domain code acquisition technique and forwards it to processor 603, which determines an actual code phase. Processor 603 then compares the predicted code phase and the actual code phase to determine the difference between the code phases. Processor 603 then converts the difference to time units and timing calibrator 605 creates a precise timing reference by adjusting the local clock in the wireless terminal.

Figure 7:
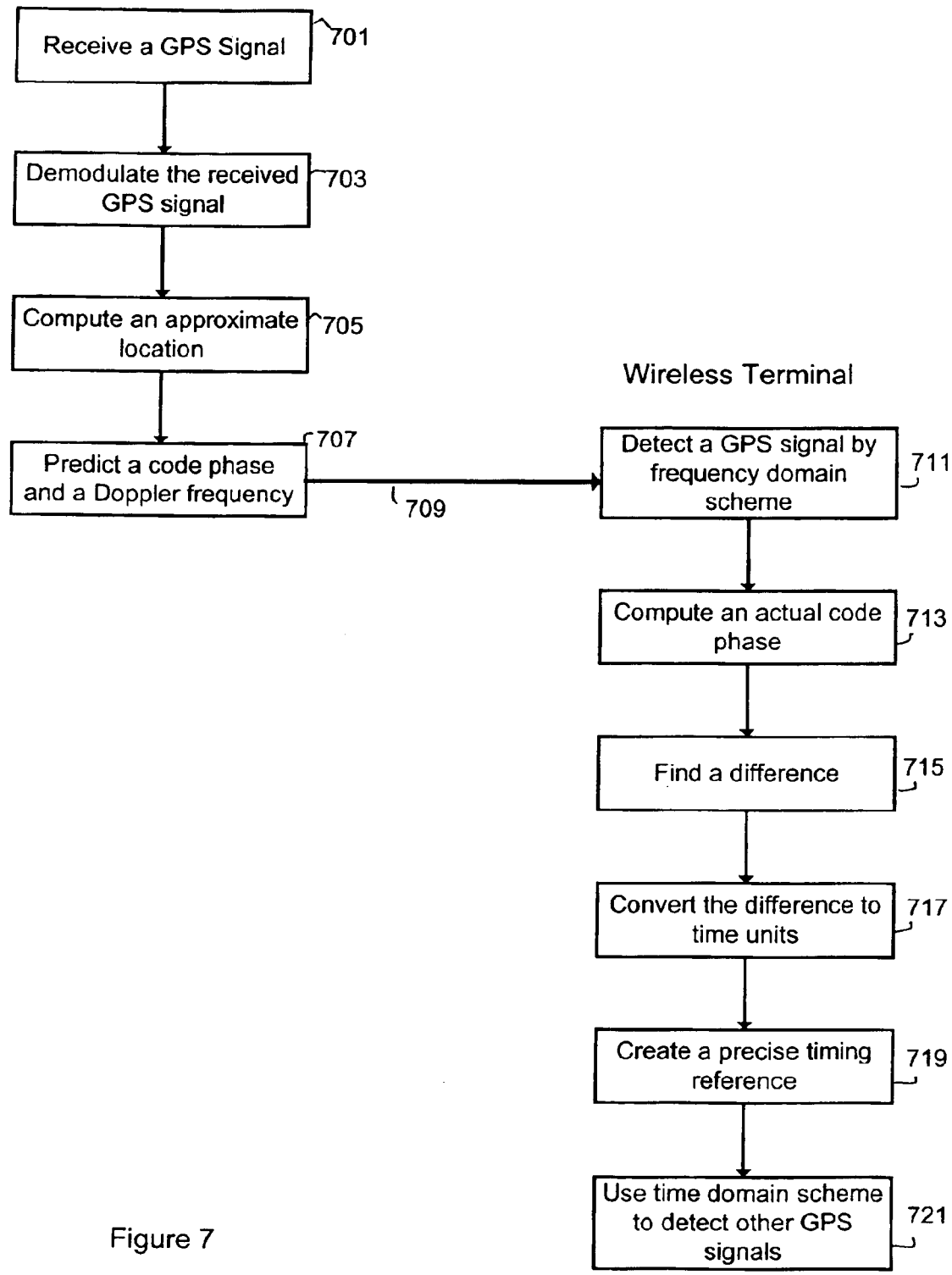
FIG. 7 is a flow-chart illustrating various steps involved in the first implementation of the present invention.

FIG. 7 is a flow-chart illustrating various steps involved in the acquisition of GPS signals in accordance with the first implementation of the present invention corresponding to FIGS. 3–4. In this method, the WGIS receives a GPS signal (step 701) to determine the satellite's ephemeris information (step 703). The WGIS also computes an approximate position of the wireless terminal based on its cell and sector (step 705). Then, the WGIS predicts a code phase and a Doppler frequency for the wireless terminal (step 707). The WGIS then forwards the predicted code phase and the predicted Doppler frequency to the wireless terminal (step 709).

The wireless terminal receives the predicted code phase and Doppler frequency and, by its GPS receiver, also detects the GPS signal from the corresponding satellite utilizing a frequency-domain code acquisition technique (step 711). The predicted Doppler frequency helps in the detection of the GPS signal. The wireless terminal then computes an actual code phase associated with the detected GPS signal (step 713). The wireless terminal then compares the actual code phase and the predicted code phase to find a difference between the code phases (step 715). The wireless terminal then converts the +code phase difference to time units (step 717) and adjusts its timing by the computed time units to create a precise timing reference (step 719). The wireless terminal is then capable of detecting other GPS signals utilizing time-domain code acquisition techniques (step 721). The other GPS signals may correspond to the same satellite or different satellites.

Figure 8:
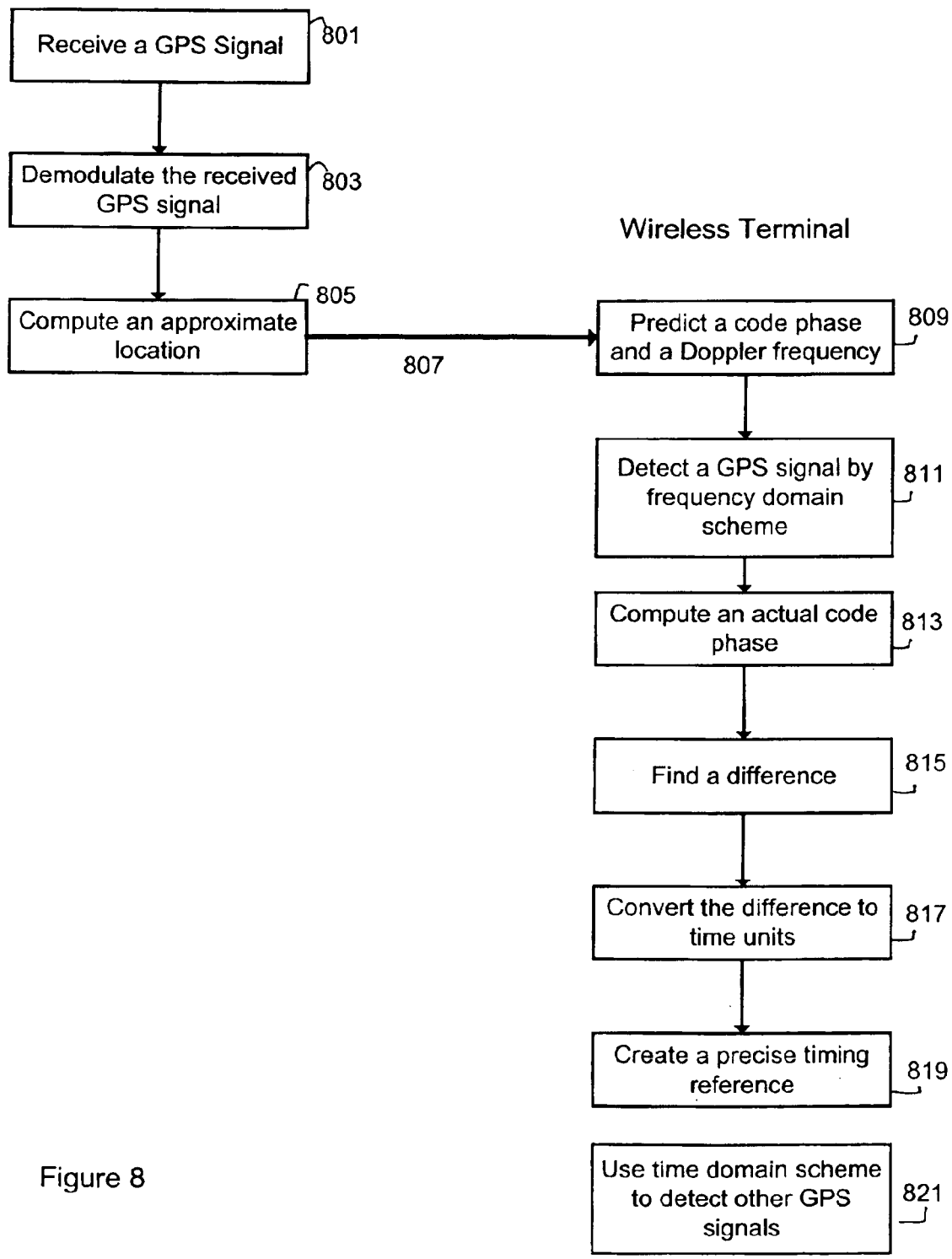
FIG. 8 is a flow-chart illustrating various steps involved in the second implementation of the present invention.

FIG. 8 illustrates the various steps involved in the second implementation of the present invention corresponding to FIGS. 5–6. The WGIS receives a GPS signal (step 801) to determine the satellite's ephemeris information (step 803). The WGIS also computes an approximate position of the wireless terminal (step 805). The WGIS then forwards the satellite ephemeris and approximate position information to the wireless terminal (step 807).

The wireless terminal utilizes the satellite ephemeris and the approximate position information to predict a code phase and a Doppler frequency (step 809). The wireless terminal also detects a GPS signal using a frequency-domain code acquisition technique (step 811) and computes an actual code phase (step 813). Steps 815–821 in FIG. 8 are similar to steps 715–721 in FIG. 7, where the difference between the actual code phase and the predicted code phase is computed and a precise timing reference is created. As in FIG. 7, the wireless terminal is then capable of detecting other GPS signals by utilizing time-domain code acquisition techniques.

In both the embodiments of FIGS. 7 and 8, the WGIS may be said to transmit "timing reference assistance information" to the wireless terminal. In the embodiment of FIG. 7, the timing reference assistance information comprises a predicted code phase and a predicted Doppler frequency, where the WGIS has generated the predicted code phase and Doppler frequency from the approximate location of the wireless terminal. In the embodiment of FIG. 8, the timing reference assistance information comprises the approximate location of the wireless terminal, and the wireless terminal then generates the predicted code phase and Doppler frequency from the approximate location of the wireless terminal.

One goal of the present invention is to reduce signal acquisition and signal processing requirements of a conventional wireless terminal so that a wireless terminal in accordance with the present invention can determine its location more quickly and with weaker GPS signals than wireless terminals in the prior art.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. At a single terminal, a method for detecting two or more signals from one or more satellites, comprising the steps of:
    (a) receiving timing reference assistance information corresponding to a detected first signal from a first satellite;
    (b) detecting a second signal from a satellite using a frequency-domain code acquisition technique;
    (c) determining an actual code phase based on the detected second signal;
    (d1) comparing a predicted code phase indicated by the timing reference assistance information and the actual code phase;
    (d2) generating a precise timing reference based on the comparison; and
    (e) detecting one or more other signals based on the precise timing reference using one or more time-domain code acquisition techniques.

2. The invention of claim 1, wherein the second signal is from the first satellite.

3. The invention of claim 1, wherein the second signal is from a second satellite different from the first satellite.

4. The invention of claim 1, wherein a predicted Doppler frequency indicated in the timing reference assistance information based on the detected first signal is used to accelerate the frequency-domain code acquisition technique used to detect the second signal.

5. The invention of claim 4, wherein the timing reference assistance information comprises the predicted Doppler frequency.

6. The invention of claim 4, wherein the predicted Doppler frequency is generated from the timing reference assistance information.

7. The invention of claim 1, wherein the one or more other signals comprise one or more signals from one or more satellites other than the first satellite.

8. The invention of claim 1, wherein the one or more other signals comprise a subsequent signal from the first satellite.

9. The invention of claim 1, further comprising the step of determining position based on the detected second signal and two or more other detected signals from two or more other satellites.

10. The invention of claim 1, wherein:
    the first signal is a first GPS signal from a first GPS satellite; and
    the second signal is a second GPS signal from the first GPS satellite.

11. The invention of claim 1, wherein the timing reference assistance information comprise the predicted code phase.

12. The invention of claim 1, wherein the predicted code phase is generated based on the timing reference assistance information.

13. The invention of claim 1, wherein the frequency-domain code acquisition technique involves applying a fast Fourier transform to the second signal.

14. The invention of claim 1, wherein the one or more other signals are detected without using any frequency-domain code acquisition technique.

15. A terminal for detecting two or more signals from one or more satellites, the terminal comprising:
    (a) a satellite receiver configured to receive the two or more signals from one or more satellites;
    (b) a telecommunication receiver configured to receive timing reference assistance information corresponding to a detected first signal from a first satellite;
    (c) a processor configured to process the two or more signals from the satellite receiver and the timing reference assistance information from the telecommunication receiver; and
    (d) a timing calibrator configured to generate a precise timing reference for the terminal, wherein:
    the satellite receiver detects a second signal from a satellite using a frequency-domain code acquisition technique;
    the processor determines an actual code phase based on the detected second signal;
    the timing calibrator (1) compares a predicted code phase indicated by the timing reference assistance information and the actual code phase and (2) generates the precise timing reference based on the comparison; and
    the processor detects one or more other signals based on the precise timing reference using one or more time-domain code acquisition techniques.

16. The invention of claim 15, wherein the second signal is from the first satellite.

17. The invention of claim 15, wherein the second signal is from a second satellite different from the first satellite.

18. The invention of claim 15, wherein the terminal uses a predicted Doppler frequency indicated in the timing reference assistance information based on the detected first signal to accelerate the frequency-domain code acquisition technique used to detect the second signal.

19. The invention of claim 18, wherein the timing reference assistance information comprises the predicted Doppler frequency.

20. The invention of claim 18, wherein the processor generates the predicted Doppler frequency from the timing reference assistance information.

21. The invention of claim 15, wherein the one or more other signals comprise one or more signals from one or more satellites other than the first satellite.

22. The invention of claim 15, wherein the one or more other signals comprise a subsequent signal from the first satellite.

23. The invention of claim 15, wherein the processor determines the position of the terminal based on the detected second signal and two or more other detected signals from two or more other satellites.

24. The invention of claim 15, wherein:
   the terminal is a wireless terminal of a wireless telecommunication network;
   the first signal is a first GPS signal from a first GPS satellite; and
   the second signal is a second GPS signal from the first GPS satellite.

25. The invention of claim 15, wherein the timing references assistance information comprises the predicted code phase.

26. The invention of claim 15, wherein the processor generates the predicted code phase based on the timing reference assistance information.

27. The invention of claim 15, wherein the frequency-domain code acquisition technique involves applying a fast Fourier transform to the second signal.

28. The invention of claim 15, wherein the one ore more other signals are detected without any frequency-domain code acquisition technique.

* * * * *